(12) United States Patent
Hellbusch et al.

(10) Patent No.: US 8,714,594 B1
(45) Date of Patent: May 6, 2014

(54) COMBINE HEADER TRANSPORT TRAILER

(71) Applicants: James A. Hellbusch, Columbus, NE (US); Patrick K. Sokol, Columbus, NE (US)

(72) Inventors: James A. Hellbusch, Columbus, NE (US); Patrick K. Sokol, Columbus, NE (US)

(73) Assignee: Duo Lift Manufacturing Co., Inc., Columbus, NE (US)

( * ) Notice: Subject to any disclaimer, the term of this patent is extended or adjusted under 35 U.S.C. 154(b) by 0 days.

(21) Appl. No.: 13/915,135

(22) Filed: Jun. 11, 2013

(51) Int. Cl.
*B62D 63/06* (2006.01)
*B60P 1/04* (2006.01)

(52) U.S. Cl.
USPC ........... 280/789; 280/781; 280/140; 280/141; 280/142; 280/143; 280/144; 280/145; 280/146; 280/147; 280/148; 280/656; 280/638; 410/44; 410/2; 410/77; 410/80; 414/470; 298/17.6; 298/17.7

(58) Field of Classification Search
USPC .............. 280/789, 781, 140–148, 656, 638; 298/17.6, 17.7; 414/470; 410/44, 2, 77, 410/80

See application file for complete search history.

(56) References Cited

U.S. PATENT DOCUMENTS

| | | | | |
|---|---|---|---|---|
| 1,414,683 | A * | 5/1922 | Anglada | 254/103 |
| 3,655,218 | A * | 4/1972 | Taylor | 410/44 |
| 4,609,179 | A * | 9/1986 | Chern et al. | 254/102 |
| 5,040,825 | A | 8/1991 | Kuhns | |
| 5,333,904 | A | 8/1994 | Kuhns | |
| 5,642,607 | A * | 7/1997 | Stephenson et al. | 56/15.1 |
| 5,785,472 | A * | 7/1998 | Smith et al. | 410/77 |
| 6,419,431 | B1 * | 7/2002 | Kuhns | 410/2 |
| 6,428,047 | B1 * | 8/2002 | Kaderabek | 280/789 |
| 7,490,856 | B1 | 2/2009 | Kuhns | |
| 8,292,328 | B2 * | 10/2012 | Honas et al. | 280/789 |
| 8,434,990 | B2 * | 5/2013 | Claussen | 414/332 |
| 8,616,812 | B2 * | 12/2013 | Bergen et al. | 410/44 |

* cited by examiner

*Primary Examiner* — Joseph M Rocca
*Assistant Examiner* — Marlon Arce
(74) *Attorney, Agent, or Firm* — Dennis L. Thomte; Thomte Patent Law Office LLC

(57) ABSTRACT

A combine header transport trailer for transporting a combine header. The trailer includes electrically operated jacks or screw actuators for raising and lowering the header bar thereon and for moving the header bar inwardly and outwardly with respect to the trailer.

4 Claims, 8 Drawing Sheets

COMBINE HEADER TRANSPORT TRAILER

BACKGROUND OF THE INVENTION

1. Field of the Invention

This invention relates to a combine header transport trailer and more particularly to a combine transport trailer which may be used to transport combine headers of various sizes and shapes. More particularly, this invention relates to a combine header transport trailer wherein the header bar or rail of the trailer is easily horizontally and vertically adjusted through the use of a pair of electrically driven jacks or screw actuators.

2. Description of the Related Art

Combine header transport trailers have been utilized for several years for transporting combine headers, after they have been removed from the combine, from one location to another. It is desirable to detach the headers from the combine so that the combine and the header may be separately moved over roads to one location to another. If the header is not removed from the combine, the width of the header on the combine makes it extremely hazardous to transport the combine from one location to another.

In most of the prior art combine header transport trailers, the header is positioned endwise on the trailer with the lower rearward end of the header being supported on a pair of back stops or brackets secured to one of the longitudinally extending frame members of the trailer frame with the underside of the header being supported by a longitudinally extending header bar at the other side of the trailer. Some combine header transport trailers have the capability of being able to adjust the position of the header bar to accommodate headers of different sizes and shapes. However, in the prior art transport trailers of which Applicants are aware, no one has previously provided a means for vertically and horizontally adjusting the header bar by means of electrically operated jacks or screw actuators. Further, Applicants are not aware of anyone who has been able to move the header bar horizontally with respect to the frame of the trailer and to also vertically raise or lower the header bar through the use of the same pair of electrically controlled jacks or screw actuators.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer is provided for the endwise transport of a combine header with the combine header having a forward end, a rearward end, a first end, and a second end. The trailer includes an elongated wheeled frame having a forward end, a rearward end, a first side and a second side. The wheeled frame includes elongated first and second horizontally spaced-apart and longitudinally extending frame members which have forward and rearward ends. A plurality of spaced-apart cross-members, having first and second ends, are secured to the first and second frame members and extend transversely therebetween.

The trailer includes a first elongated and transversely extending header bar support member which has inner and outer ends. The first header bar support member has its inner end pivotally secured, about a horizontal axis, to one of the cross-members rearwardly of the forward end of the wheeled frame. The inner end of the first header bar support member is pivotally secured to the respective cross-member between the first and second ends thereof so as to extend therefrom towards the second frame member whereby the outer end of the first header bar support member is disposed laterally outwardly and above the second frame member. A first slider assembly is selectively slidably adjustably mounted on the first header bar support with the first slider assembly including a selective locking pin for locking the first slider assembly to first header bar support member. A first support is provided which has upper and lower ends with the upper end of the first support being pivotally secured to the first header bar support member between the inner and outer ends thereof. The lower end of the first support is selectively vertically adjustably secured to the respective cross-member.

The trailer also includes a second elongated and transversely extending header bar support member having inner and outer ends, the inner end thereof being pivotally secured about a horizontal axis, to one of the cross-members forwardly of the rearward end of the wheeled frame. The inner end of the second header bar support member is pivotally secured to the respective cross-member between the first and second ends thereof so as to extend therefrom towards the second frame member so that the outer end of the second header bar support member is disposed laterally outwardly and above the second frame member. A second slider assembly is selectively slidably adjustably mounted on the second header bar support member with the second slider assembly including a selective locking pin for selectively locking the second slider assembly to the second header bar support member. The trailer also includes a second support having upper and lower ends with the upper end of the second support being pivotally secured to the second header bar support member between the inner and outer ends thereof. The lower end of the second support is selectively vertically adjustably secured to the respective cross-member.

The trailer further includes an elongated and longitudinally extending header bar having a forward end and a rearward end. The header bar is mounted on and secured to the first and second slider assemblies and extends therebetween. A first electrically operated jack or screw actuator is also provided which has a base end and a rod end. The first jack is extendable and retractable with the base end of the first jack being selectively removably secured to the first header bar support member. The rod end of the first jack is selectively removably secured to the first slider assembly.

The trailer also includes a second electrically operated jack or screw actuator having a base end and a rod end. The base end of the second jack is selectively removably secured to the second header bar support member. The rod end of the second jack is selectively removably secured to the second slider assembly.

The extension of the first and second jacks, when the first and second slider assemblies are unlocked from the first and second header bar support members respectively, causing the first and second slider assemblies and the header bar thereon to move towards the outer ends of the first and second header bar support members. The retraction of the first and second jacks, when the first and second slider assemblies are unlocked from the first and second header bar support members respectively, causing the first and second slider assemblies and the header bar to move towards the inner ends of the first and second header bar support members.

An important feature of the invention is that the first jack may be disconnected from the first header bar support member and the first slider assembly and connected to the outer end of the first header bar support member and the second frame and wherein the second jack member may be disconnected from the second header bar support member and the second slider assembly and connected to the outer end of the second header bar support member and the second frame member to raise and lower the outer ends of the first and second header bar support members and the header bar when the first and second supports are disconnected from either the first and second header bar support members or the respective cross-members.

It is therefore a principal object of the invention to provide an improved combine header transport trailer.

A further object of the invention is to provide a combine header transport trailer wherein the header bar thereof may be easily adjusted through the use of a pair of electrically operated jacks or screw actuators.

A further object of the invention is to provide a trailer of the type described wherein a pair of electrically operated jacks or screw actuators may be used to not only move the header bar laterally outwardly or inwardly with respect to the trailer but which may also be used to raise and lower the header bar with respect to the trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
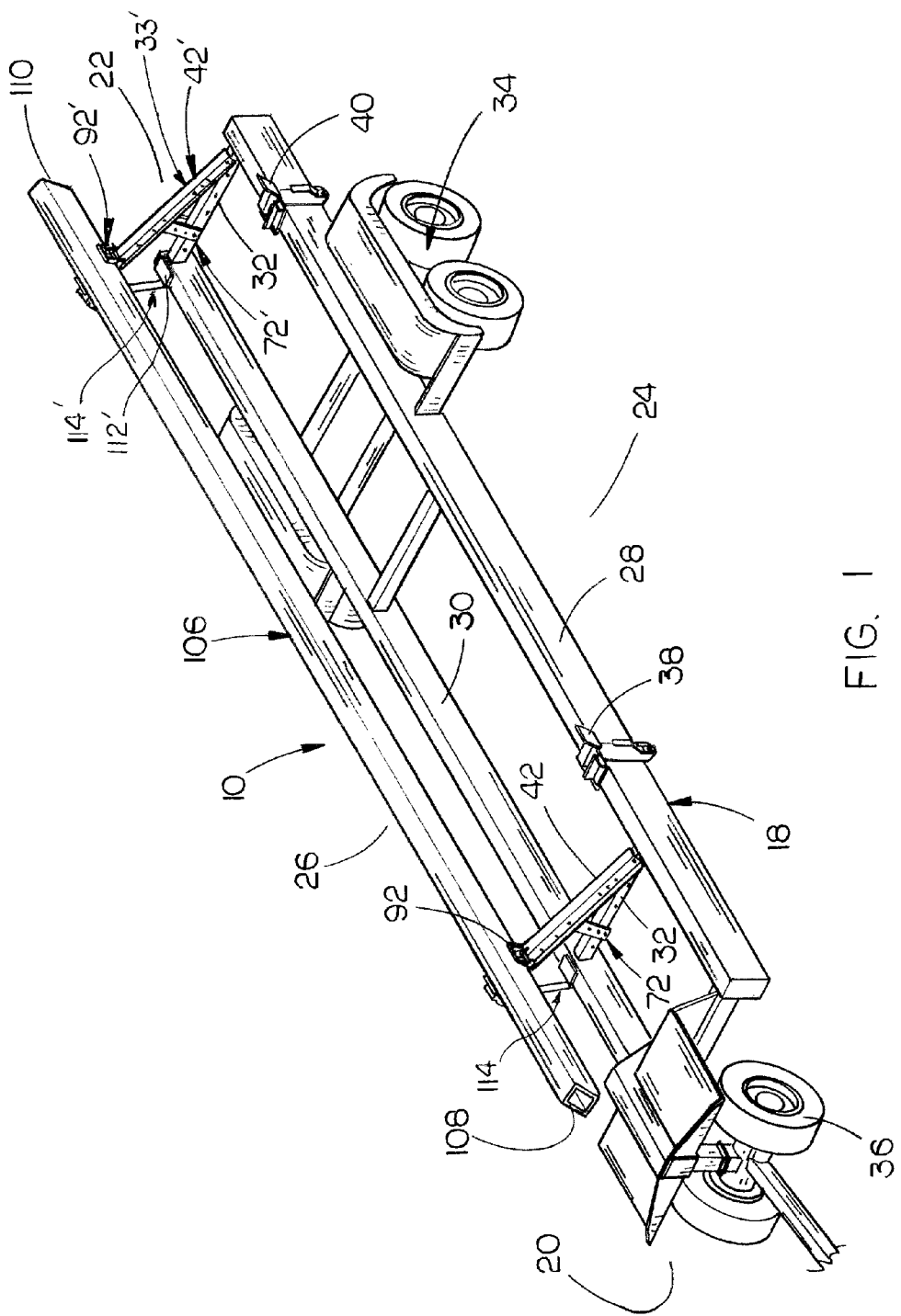
FIG. 1 is a perspective view of the combine header transport trailer of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The trailer of this invention is designated by the reference numeral 10 which is designed for the endwise transport of a combine header 12. Header 12 is conventional in design and includes a forward end 14, rearward end 16, and opposite ends. Trailer 10 includes a wheeled frame 18 having a forward end 20, rearward end 22, a first side 24 and a second side 26.

Wheeled frame 18 includes a first elongated and longitudinally extending frame member 28 and a second elongated and longitudinally extending frame member 30 which is horizontally spaced from frame member 28. A cross-member 32 is secured to and extend between frame members 28 and 30 rearwardly of the forward end 20 of the frame 18. Cross-member 32' is secured to and extends between the frame members 28 and 30 at the rearward end of the frame 18. A plurality of other cross-members also extend between the frame members 28 and 30 in conventional fashion. Inasmuch the header bar support structure 33 on cross-member 32 is identical to the header bar support structure 33' on cross-member 32', only the header bar support structure on cross-member 32 will be described in detail with identical structure on cross-member 32' being designated by "'". A running gear or rear wheel assembly 34 supports the rearward end of the frame 18. A hitch 36 is provided at the forward end of frame 18 in conventional fashion. A pair of identical support brackets 38 and 40 are secured to frame member 28, as seen in FIG. 1.

Although the drawings illustrate two of the cross-members having header bar support structure thereon, additional support structures could be provided if so desired. The numeral 42 refers to a first header bar support member having an inner end 44 and an outer end 46. Inner end 44 of header bar support member 42 is pivotally secured to cross-member 32 by a pivot pin 48. A pair of spaced-apart ears 50 and 52 are provided at end 46 of header bar support member 42 which are adapted to have pin 54 extending therethrough.

Top wall 56 of header bar support member 42 has an opening 58 formed therein which defines intersecting rectangular slots 60 and 62 with slot 62 having a greater length than slot 60. Side wall 64 of header bar support member 42 has an opening 66 formed therein with sidewall 68 having an opening formed therein which registers with opening 66 and which are adapted to receive pin 70 extending therethrough.

The numeral 72 refers to a support which is comprised of spaced-apart plates 74 and 76 having a plate or bar 78 extending therebetween. The upper end of plate 74 has an opening 80 formed therein which registers with opening 82 formed in the upper end of plate 76. Plate 74 has a plurality of vertically spaced openings 84 formed therein which registers with a plurality of vertically spaced openings 86 formed in plate 76. The upper end of support 72 is received between the side walls 64 and 68 of header bar support 42 and is secured thereto by pin 70. The lower end of support 72 is adjustably vertically secured to cross-member 32 by pin 88. Side wall 64 has a plurality of spaced-apart openings 90 formed therein which register with openings formed in side wall 68.

The numeral 92 refers to a slider assembly which is slidably adjustably mounted on header bar support member 42 by pin 94 which extends through one of the openings 90, through slider assembly 92, and through registering openings in side wall 68. Slider assembly 92 includes upstanding walls 96 and 98 which define a pocket 100. Clevis 102 is secured to slider assembly 92 and is adapted to receive pin 104 extending therethrough.

Figure 7:
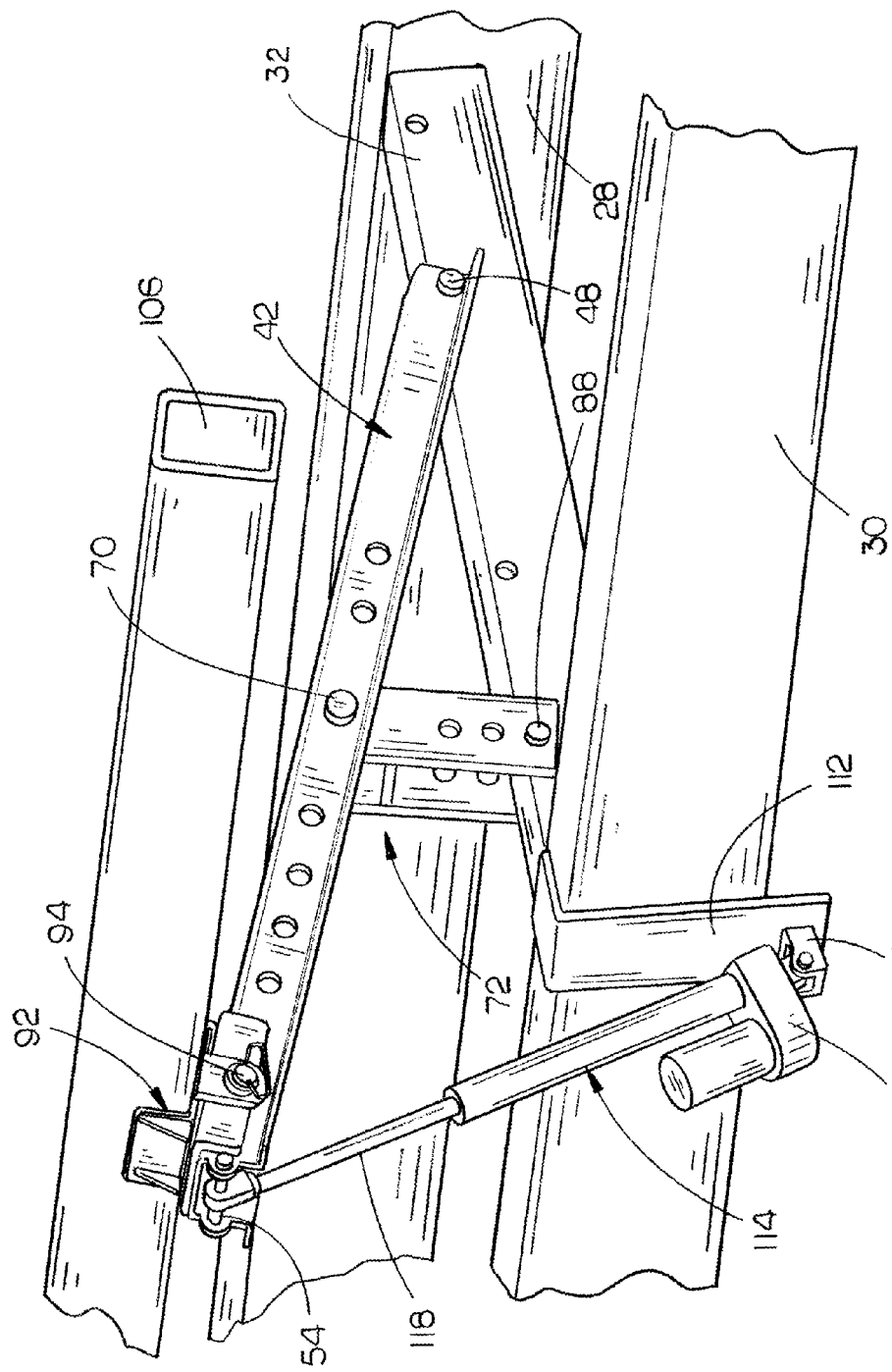
FIG. 7 is a partial front perspective view of the first combine header support member but which shows the jack thereof in its alternate position.
Figure 8:
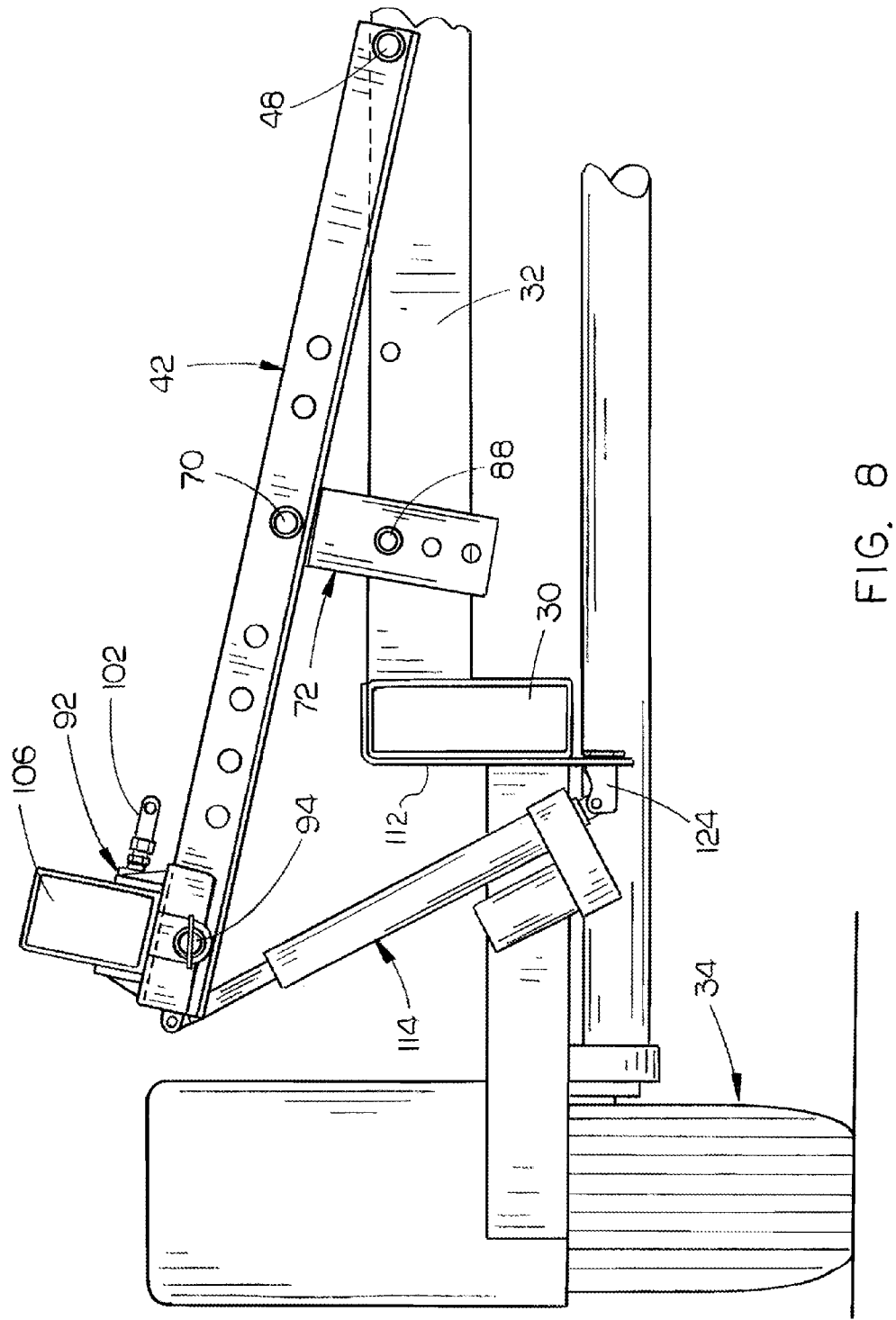
FIG. 8 is a front view of the structure of FIG. 7.

The numeral 106 refers to an elongated header bar having a forward end 108 and a rearward 110. Bracket 112 is secured to frame member 30 as seen in FIG. 7 which is in alignment with the header bar support member 42 and which has a slot (not shown) formed in the lower end thereof which is identical to the slot 60 previously described.

The numeral 114 refers to a jack or screw actuator having a base 116 and a rod 118 extending therefrom which is movable between retracted and extended positions. The end of rod 118 has a connector 120 mounted thereon which is adapted to receive between the legs of the clevis 102 and secured thereto by pin 104. An ear 122 is secured to base 116 and is secured to a connector 124 by pin 126. Connector 124 has a rectangular base which is adapted to be inserted into the slot 60 as will be described hereinafter.

When it is desired to transport a combine header 12, the trailer of this invention permits the header bar 106 to be adjustably moved inwardly and outwardly with respect to the trailer frame 18 and permits the header bar 106 to be adjustably moved upwardly and downwardly with respect to the trailer frame 18 to accommodate various sizes and shapes of the combine header which is to be transported.

Normally, the two jacks 114 and 114' will not be positioned on the trailer 10. If it is desired to move the header bar 106 inwardly or outwardly with respect to the trailer frame 18, the face 126 of connector 124 on the jack 114 will be inserted downwardly into the slot 62 of opening 58. The jack 114 is then rotated 90 degrees so that the base 126 will be positioned slot 60 and will be retained in opening 58. The connector 120 of jack 114 is then connected to clevis 102 of slider assembly 92 by pin 104. Pin 94 is then disconnected from header bar support member 42. The same procedure is performed on the header bar supporting structure 33'.

The jacks 114 and 114' are then electrically connected to a source of electrical power. The header bar 106 is adjustably moved outwardly with respect to the trailer frame 18 by extending the jacks 114 and 114'. The header bar 106 may be adjustably moved inwardly with respect to trailer frame 18 by retracting the jacks 114 and 114' so that the slider assemblies 92 and 92' slidably move inwardly on members 42 and 42'. The jacks 114 and 114' will normally be disconnected from their respective slider assemblies and support members after the header bar 106 has been properly positioned.

If it is necessary to raise or lower the header 106, the jack 114 will be connected to the outer end of support member 42 and the bracket 112. Pin 88 is then removed from its connection with cross-member 32 and 72. The jack 114' will be similarly connected to the outer end of support member 42' and the bracket 112'. Extension of the jacks 114 and 114' cause the header bar 106 to be raised with respect to the trailer frame 18. Retraction of jacks 114 and 114' cause the header bar 106 to be lowered with respect to the trailer frame 18. When the header bar 106 is in its proper position, the supports 72 and 72' will then again be pinned to the cross-member 32 and cross-member 32' respectively. Normally, the jacks 114 and 114' will be disconnected from the outer ends of the support members 42 and 42' and will be disconnected from the brackets 112 and 112'.

Figure 2:
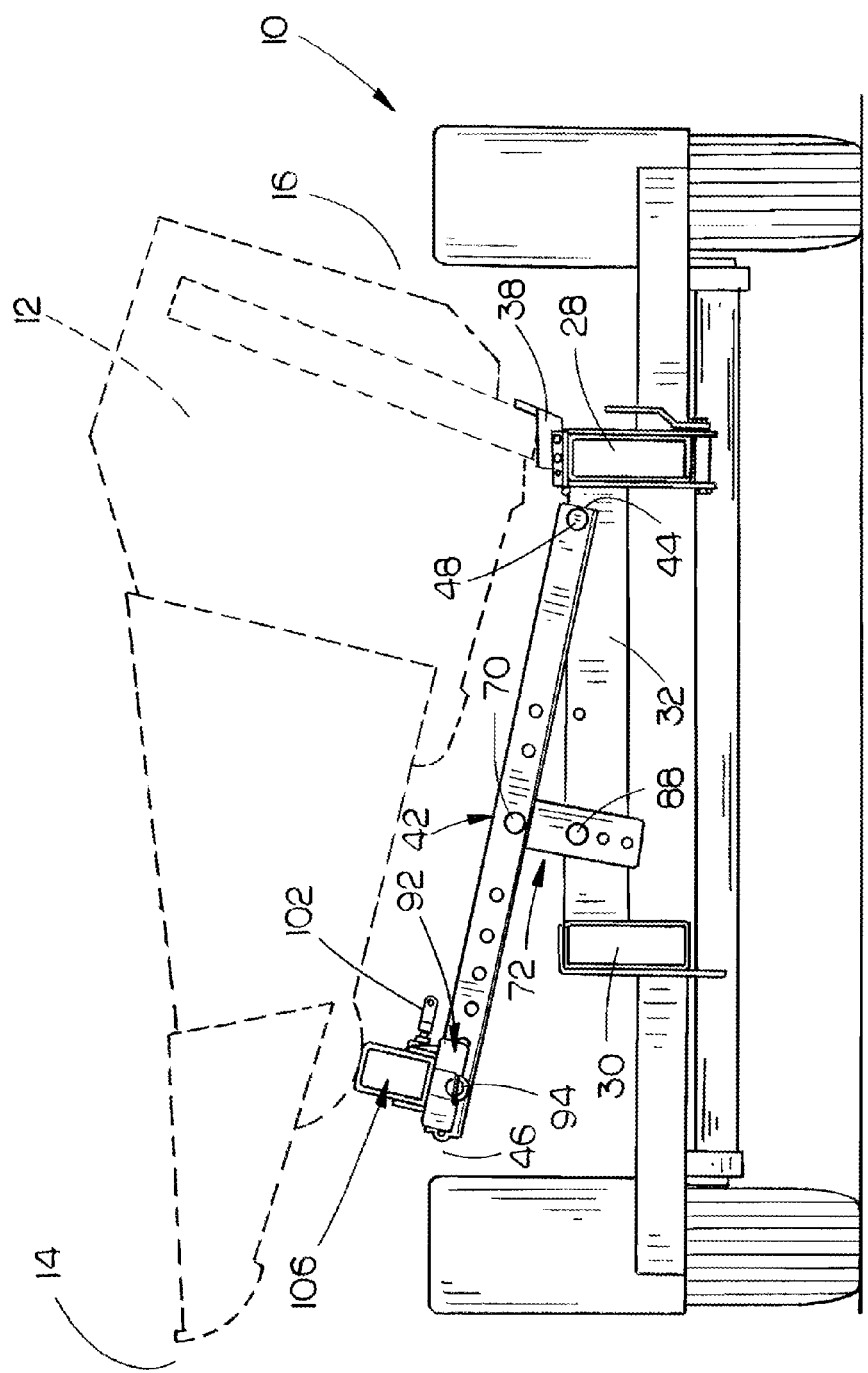
FIG. 2 is a front view of the combine header transport trailer of this invention and which illustrates a combine header, in broken lines, supported on the trailer.
Figure 3:
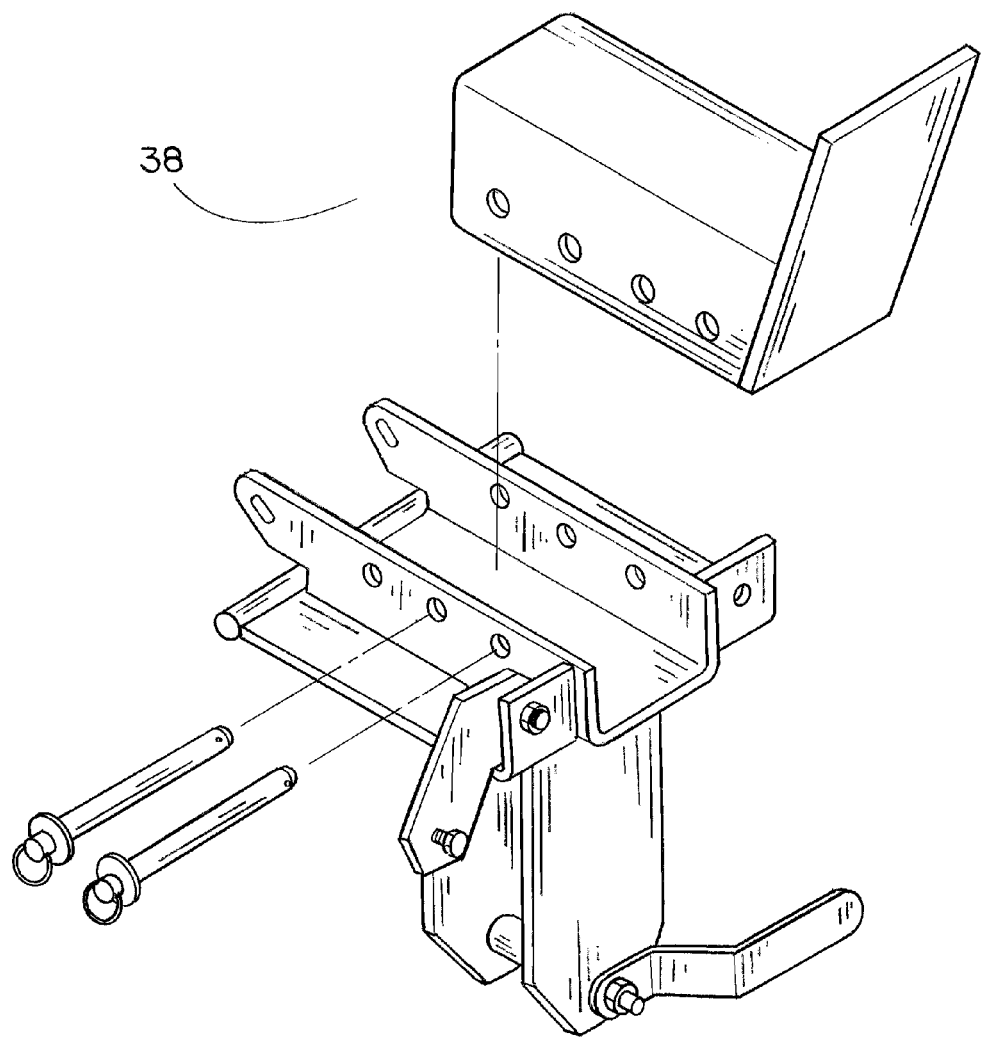
FIG. 3 is an exploded perspective view of one of the header support brackets of the invention.
Figure 4:
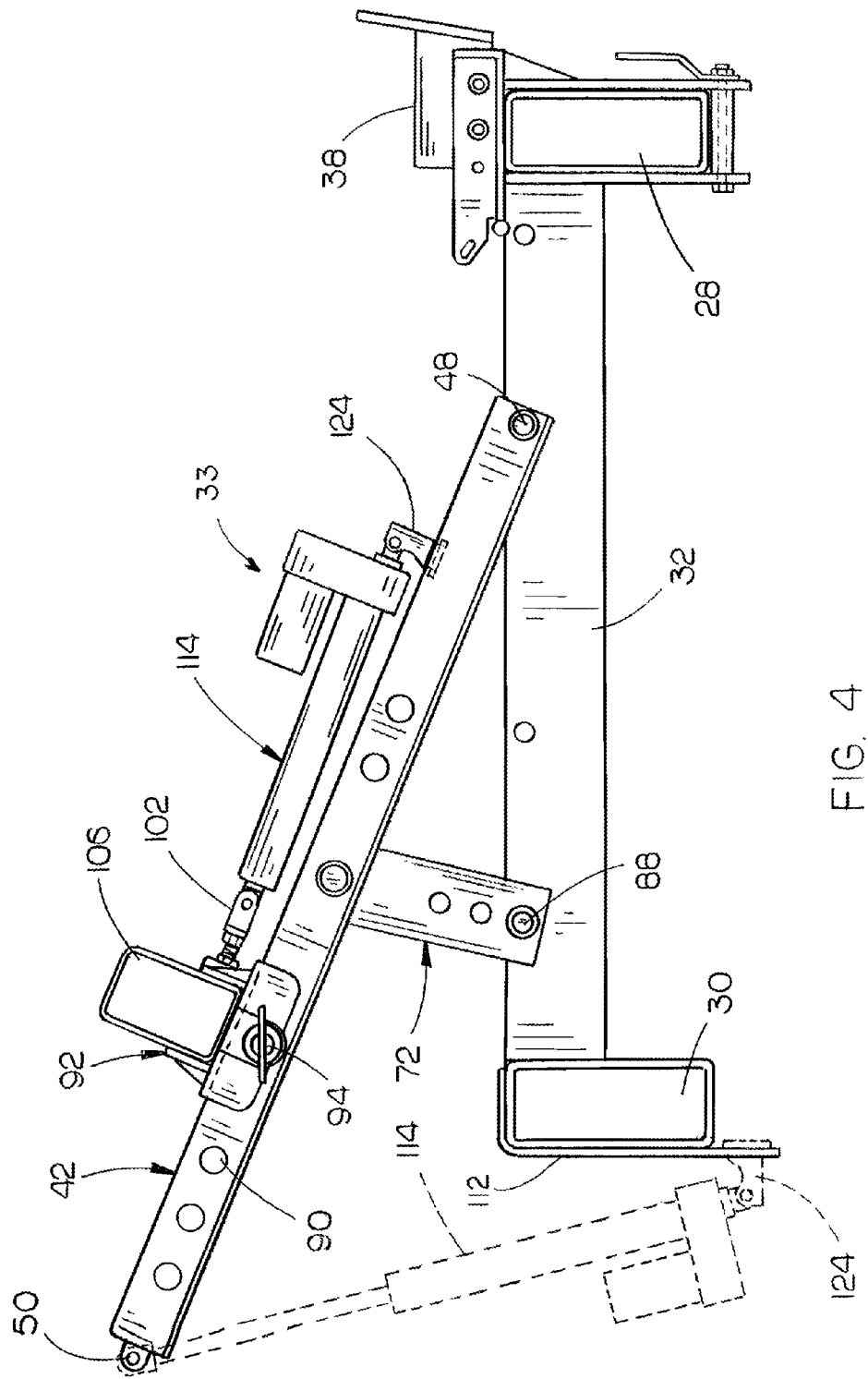
FIG. 4 is a partial front view of the trailer with the broken liens illustrating the alternate position of one of the jacks of this invention.
Figure 5:
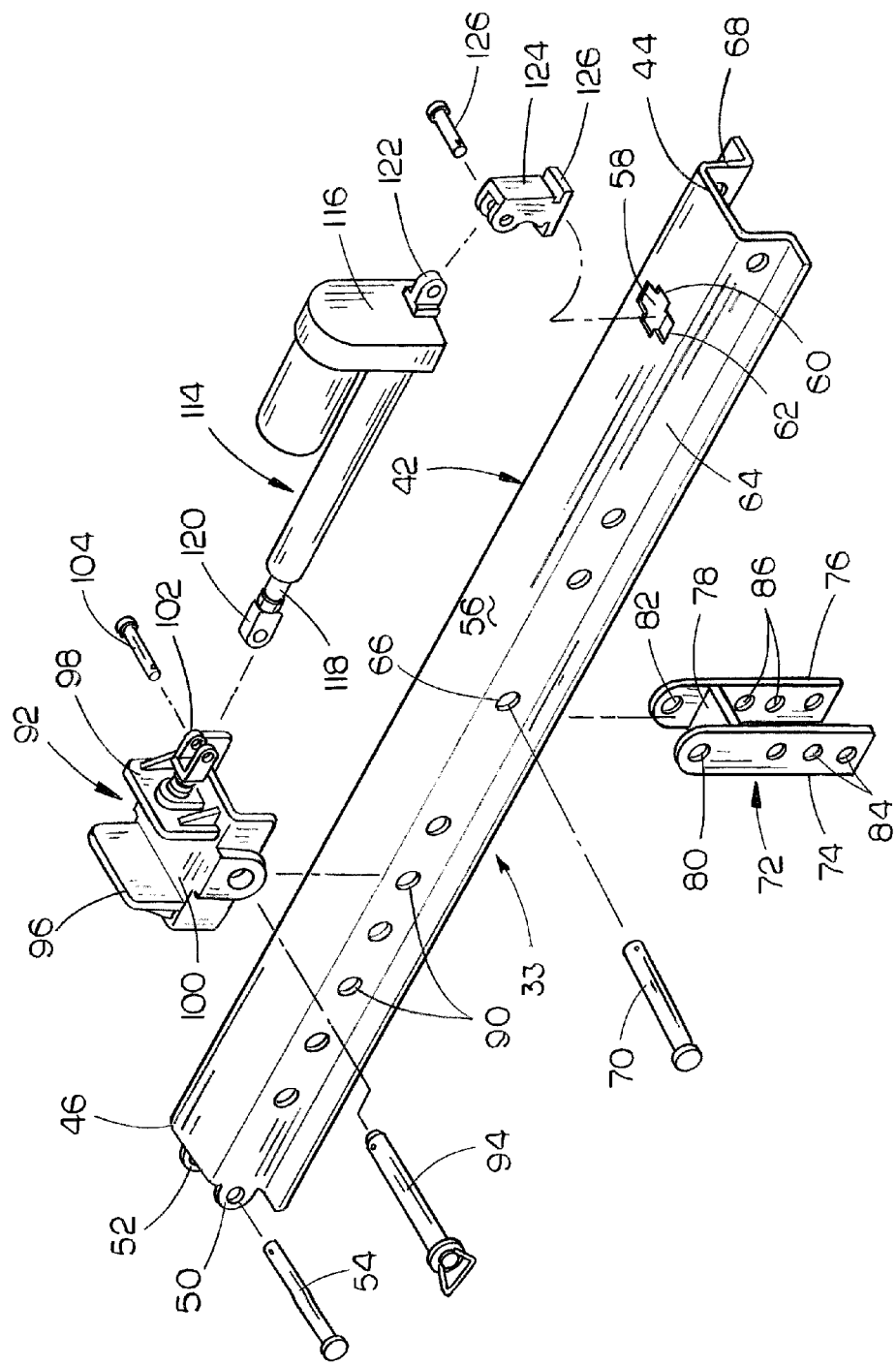
FIG. 5 is an exploded perspective view of one of the header bar support members and associated structure.
Figure 6:
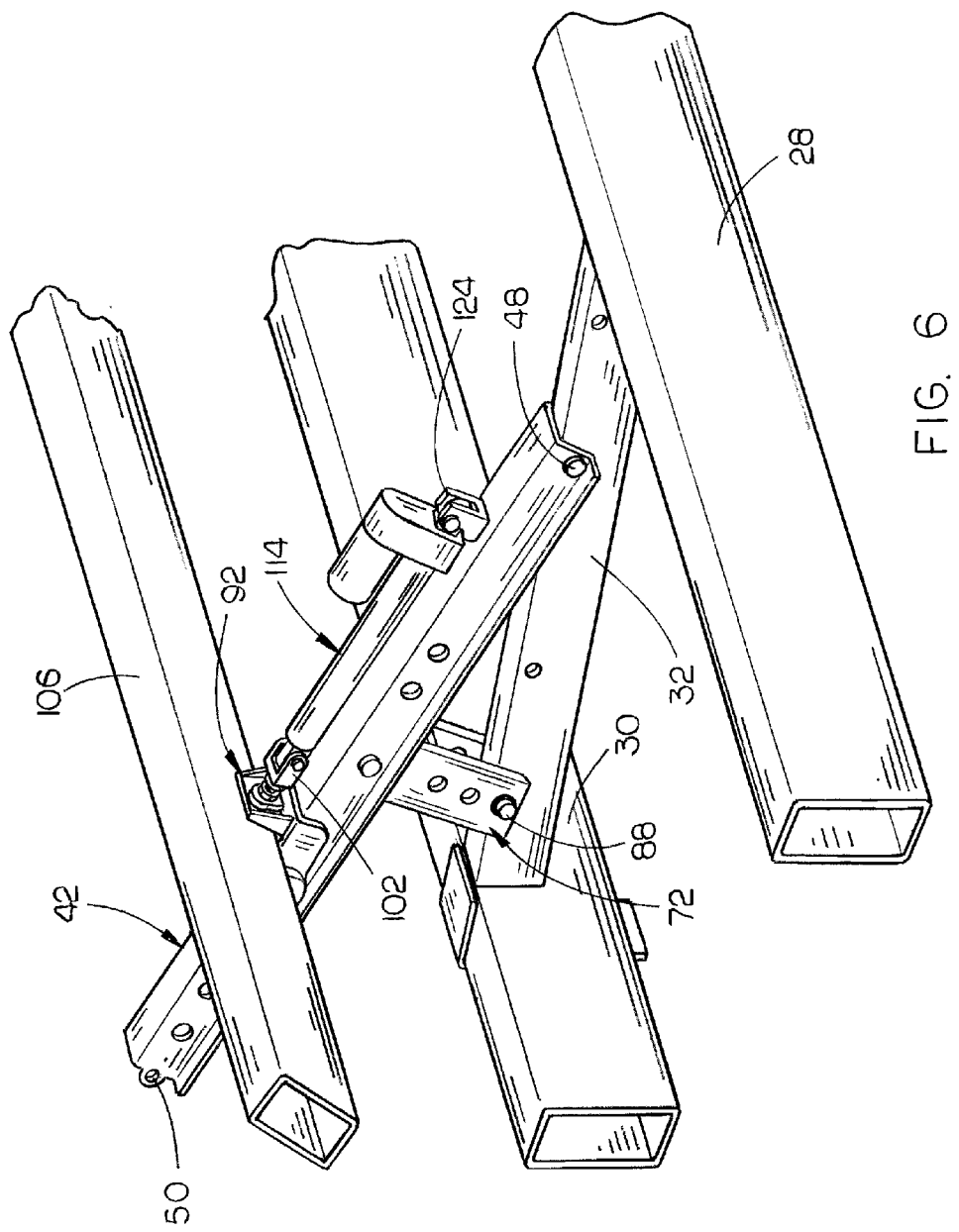
FIG. 6 is a partial front perspective view of the first combine header support member and its associated structure.

The combine header 12 is then placed upon the trailer 10 such as seen in FIG. 2 in conventional fashion and secured thereto by adjustable tie-down straps.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A trailer for the endwise transport of a combine header with the combine header having a forward end, a rearward end, a first end and a second end, comprising:

an elongated wheeled frame having a forward end, a rearward end, a first side, and a second side;

said wheeled frame including elongated and longitudinally extending first and second horizontally spaced-apart frame members, having forward and rearward ends, which have a plurality of spaced-apart cross-members, having first and second ends, secured to said first and second frame members and which extend therebetween;

said first ends of said cross-members being secured to said first frame member;

said second ends of said cross-members being secured to said second frame member;

a first elongated, transversely extending header bar support member having inner and outer ends;

said first header bar support member having its said inner end pivotally secured, about a horizontal axis, to one of said cross-members rearwardly of said forward end of said frame;

said inner end of said first header bar support member being pivotally secured to the respective cross-member between said first and second ends of said respective cross-member so as to extend therefrom towards said second frame member whereby said outer end of said first header bar support member is disposed laterally outwardly and above said second frame member;

a first slider assembly selectively longitudinally slidably adjustably mounted on said first header bar support;

said first slider assembly including a selective locking pin for locking said first slider assembly to said first header bar support member in various positions with respect thereto;

a first support having upper and lower ends;

said upper end of said first support being pivotally secured to said first header bar support member between said inner and outer ends of said first header bar support member;

said lower end of said first support being selectively vertically adjustably secured to the respective cross-member;

a second elongated, transversely extending header bar support member having inner and outer ends;

said second header bar support member having its said inner end pivotally secured, about a horizontal axis, to one of said cross-members forwardly of said rearward end of said frame;

said inner end of said second header bar support member being pivotally secured to the respective cross-member between said first and second ends of the respective cross-member so as to extend therefrom towards said second frame member whereby said outer end of said second header bar support member is disposed laterally outwardly and above said second frame member;

a second slider assembly selectively longitudinally slidably adjustably mounted on said second header bar support member;

said second slider assembly including a selective locking pin for selectively locking said second slider assembly to said second header bar support member in various positions with respect thereto;

a second support having upper and lower ends;

said upper end of said second support being pivotally secured to said second header bar support member between said inner and outer ends;

said lower end of said second support being selectively vertically adjustably secured to the respective cross-member;

an elongated and longitudinally extending header bar having a forward end, and a rearward end;

said header bar being mounted on said first and second slider assemblies and extending therebetween;
a first electrically operated jack having a base end and a rod end;
said first jack being extendable and retractable;
said base end of said first jack being selectively removably secured to said first header bar support member;
said rod end of said first jack being selectively removably secured to said first slider assembly;
a second electrically operated jack having a base end and a rod end;
said base end of said second jack being selectively removably secured to said second header bar support member;
said rod end of said second jack being selectively removably secured to said second slider assembly;
the extension of said first and second jacks, when said first and second slider assemblies are unlocked from said first and second header bar support members, causing said first and second slider assemblies and said header bar to move towards said outer ends of said first and second header bar support members;
the retraction of said first and second jacks, when said first and second slider assemblies are unlocked from said first and second header bar support members, causing said first and second slider assemblies and said header bar to move towards said inner ends of said first and second header bar support members.

2. The trailer of claim 1 wherein said first jack may be disconnected from said first header bar support member and said first slider assembly and connected to the outer end of said first header bar support member and said second frame member and wherein said second jack may be disconnected from said second header bar support member and said second slider assembly and connected to the outer end of said second header bar support member and said second frame member to raise and lower the outer ends of said first and second header bar support member and said header bar when said first and second supports are disconnected from either said first and second header bar support members or the respective cross-members.

3. A trailer for the endwise transport of a combine header with the combine header having a forward end, a rearward end, a first end and a second end, comprising:
an elongated wheeled frame having a forward end, a rearward end, a first side, and a second side;
said wheeled frame including elongated first and second horizontally spaced-apart frame members, having forward and rearward ends, which have a plurality of spaced-apart cross-members, having first and second ends, secured to said first and second frame members and which extend therebetween;
said first ends of said cross-members being secured to said first frame member;
said second ends of said cross-members being secured to said second frame member;
a first elongated, transversely extending header bar support member having inner and outer ends;
said first header bar support member having its said inner end pivotally secured, about a horizontal axis, to one of said cross-members rearwardly of said forward end of said frame;
said inner end of said first header bar support member being pivotally secured to the respective cross-member between said first and second ends of said respective cross-member so as to extend therefrom towards said second frame member whereby said outer end of said first header bar support member is disposed laterally outwardly and above said second frame member;
a first slider assembly selectively longitudinally slidably adjustably mounted on said first header bar support member;
said first slider assembly including a selective locking pin for locking said first slider assembly to said first header bar support member in various positions with respect thereto;
a first support having upper and lower ends;
said upper end of said first support being pivotally secured to said first header bar support member between said inner and outer ends of said first header bar support member;
said lower end of said first support being selectively vertically adjustably secured to the respective cross-member;
a second elongated, transversely extending header bar support member having inner and outer ends;
said second header bar support member having its said inner end pivotally secured, about a horizontal axis, to one of said cross-members forwardly of said rearward end of said frame;
said inner end of said second header bar support member being pivotally secured to the respective cross-member between said first and second ends of the respective cross-member so as to extend therefrom towards said second frame member whereby said outer end of said second header bar support member is disposed laterally outwardly and above said second frame member;
a second slider assembly selectively longitudinally slidably adjustably mounted on said second header bar support member;
said second slider assembly including a selective locking pin for selectively locking said second slider assembly to said second header bar support members in various positions with respect thereto;
a second support having upper and lower ends;
said upper end of said second support being pivotally secured to said second header bar support member between said inner and outer ends of said second header bar support member;
said lower end of said second support being selectively vertically adjustably secured to the respective cross-member;
an elongated and longitudinally extending header bar having a forward end, and a rearward end;
said header bar being mounted on said first and second slider assemblies and extending therebetween;
a first electrically operated jack having a base end and a rod end;
said first jack being extendable and retractable;
said base end of said first jack being operatively selectively removably secured to said second frame member;
said rod end of said first jack being selectively removably secured to said outer end of said first header bar support member;
a second electrically operated jack having a base end and a rod end;
said base end of said second jack being operatively selectively removably secured to said second frame member;
said rod end of said second jack being selectively removably secured to said outer end of said second header bar support member;
the extension of said first and second jacks, when said first and second supports are disconnected from either said first and second header bar support members or the respective cross-members, causing said outer ends of said first and second header bar support members and the header bar be moved upwardly;

the retraction of said first and second jacks, when said first and second supports are disconnected from either said first and second header bar support members or the respective cross-members, causing said outer ends of said first and second header bar support members and the header bar to be moved downwardly.

4. A trailer for the endwise transport of a combine header with the combine header having a forward end, a rearward end, a first end and a second end, comprising:

an elongated wheeled frame having a forward end, a rearward end, a first side, and a second side;

said wheeled frame including elongated first and second horizontally spaced-apart frame members, having forward and rearward ends, which have a plurality of spaced-apart cross-members, having first and second ends, secured to said first and second frame members and which extend therebetween;

said first ends of said cross-members being secured to said first frame member;

said second ends of said cross-members being secured to said second frame member;

a first elongated, transversely extending header bar support member having inner and outer ends;

said first header bar support member having its said inner end pivotally secured, about a horizontal axis, to one of said cross-members rearwardly of said forward end of said frame;

said inner end of said first header bar support member being pivotally secured to the respective cross-member between said first and second ends thereof so as to extend therefrom towards said second frame member whereby said outer end of said first header bar support member is disposed laterally outwardly and above said second frame member;

a first slider assembly selectively slidably adjustably mounted on said first header bar support;

said first slider assembly including a selective locking pin for locking said first slider assembly to said first header bar support member;

a first support having upper and lower ends;

said upper end of said first support being pivotally secured to said first header bar support between said inner and outer ends thereof;

said lower end of said first support being selectively vertically adjustably secured to the respective cross-member;

a second elongated, transversely extending header bar support member having inner and outer ends;

said second header bar support member having its said inner end pivotally secured, about a horizontal axis, to one of said cross-members forwardly of said rearward end of said frame;

said inner end of said second header bar support member being pivotally secured to the respective cross-member between said first and second ends thereof so as to extend therefrom towards said second frame member whereby said outer end of said second header bar support member is disposed laterally outwardly and above said second frame member;

a second slider assembly selectively slidably adjustably mounted on said second header bar support member;

said second slider assembly including a selective locking pin for selectively locking said second slider assembly to said second header bar support member;

a second support having upper and lower ends;

said upper end of said second support being pivotally secured to said second header bar support member between said inner and outer ends thereof;

said lower end of said second support being selectively vertically adjustably secured to the respective cross-member;

an elongated and longitudinally extending header bar having a forward end, and a rearward end;

said header bar being mounted on and secured to said first and second slider assemblies and extending therebetween;

an electrically operated jack means for moving each of said first and second slider assemblies with respect to said first and second header bar support members; and an electrically operated jack means for raising and lowering each of said outer ends of said first and second header bar support members.

* * * * *